US011281629B2

(12) United States Patent
Balachandran et al.

(10) Patent No.: US 11,281,629 B2
(45) Date of Patent: Mar. 22, 2022

(54) USING AND TRAINING A MACHINE LEARNING MODULE TO DETERMINE ACTIONS TO BE TAKEN IN RESPONSE TO FILE SYSTEM EVENTS IN A FILE SYSTEM

(71) Applicant: INTERNATIONAL BUSINESS MACHINES CORPORATION, Armonk, NY (US)

(72) Inventors: Subashini Balachandran, Sunnyvale, CA (US); John T. Olson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 16/355,418

(22) Filed: Mar. 15, 2019

(65) Prior Publication Data

US 2020/0293495 A1    Sep. 17, 2020

(51) Int. Cl.
*G06F 16/17* (2019.01)
*G06F 16/11* (2019.01)
*G06F 11/14* (2006.01)
*G06N 3/08* (2006.01)
*G06N 20/00* (2019.01)

(52) U.S. Cl.
CPC ...... *G06F 16/1734* (2019.01); *G06F 11/1435* (2013.01); *G06F 16/128* (2019.01); *G06N 3/084* (2013.01); *G06N 20/00* (2019.01)

(58) Field of Classification Search
CPC .............. G06F 16/1734; G06F 16/128; G06F 11/1435; G06N 20/00; G06N 3/084
USPC ....................................................... 707/822
See application file for complete search history.

(56) References Cited

U.S. PATENT DOCUMENTS

2013/0212433 A1    8/2013  Gunabalasubramaniam et al.
2015/0373043 A1*  12/2015  Wang ................. G06F 21/6254
                                                                    706/12
2017/0249334 A1    8/2017  Karampuri et al.
(Continued)

FOREIGN PATENT DOCUMENTS

CN            105337765 A      2/2016

OTHER PUBLICATIONS

Machine Translation of CN105337765A, published Oct. 12, 2018, Total 3 pages.
(Continued)

*Primary Examiner* — Evan Aspinwall
(74) *Attorney, Agent, or Firm* — Konrad Raynes Davda & Victor LLP; David W. Victor (57) ABSTRACT

Provided are a computer program product, system, and method for using and training a machine learning module to determine actions to be taken in response to file system events in a file system. A file system event is detected. An action to be performed corresponding to the file system event is selected from an action list. A determination is made as to whether an outcome in the computing system resulting from the performed action satisfies an outcome threshold. A machine learning module is trained to increase a likelihood of selecting the performed action corresponding to the file system event when the outcome satisfies the outcome threshold. The machine learning module is trained to decrease a likelihood of selecting the performed action corresponding to the file system event when the outcome does not satisfy the outcome threshold.

23 Claims, 9 Drawing Sheets

(56) References Cited

U.S. PATENT DOCUMENTS

| | | |
|---|---|---|
| 2018/0121650 A1 | 5/2018 | Brown |
| 2019/0020669 A1* | 1/2019 | Glatfelter .............. H04W 12/12 |
| 2019/0250839 A1* | 8/2019 | Bedadala ................ G06F 3/067 |
| 2019/0260786 A1* | 8/2019 | Dunn ...................... H04L 63/20 |
| 2019/0319961 A1* | 10/2019 | Levy .................... H04L 63/102 |

OTHER PUBLICATIONS

"A curious case of memory leak in a node.js app—Technical Blog—Future Processing", Technical Blog, dated Feb. 11, 2019 (online) retrieved from the Internet at URL>https://www.future-processing.pl/blog/a-curious-case-of-memory-leak-in . . . , Total 3 pages.

* cited by examiner

USING AND TRAINING A MACHINE LEARNING MODULE TO DETERMINE ACTIONS TO BE TAKEN IN RESPONSE TO FILE SYSTEM EVENTS IN A FILE SYSTEM

BACKGROUND OF THE INVENTION

1. Field of the Invention

The present invention relates to a computer program product, system, and method for using and training a machine learning module to determine actions to be taken in response to file system events.

2. Description of the Related Art

A file system may generate events related to file system operations indicating errors, performance problems, memory leaks, user access requests, etc. To detect problems, errors and other issues and to determine an optimal courses of action, a developer or user may need to analyze event logs to determine corrective actions to address problems in reported file system events.

There is a need in the art for improved techniques to handle file system events in a computer system.

SUMMARY

Provided are a computer program product, system, and method for using and training a machine learning module to determine actions to be taken in response to file system events in a file system. A file system event is detected. An action to be performed corresponding to the file system event is selected from an action list. A determination is made as to whether an outcome in the computing system resulting from the performed action satisfies an outcome threshold. A machine learning module is trained to increase a likelihood of selecting the performed action corresponding to the file system event when the outcome satisfies the outcome threshold. The machine learning module is trained to decrease a likelihood of selecting the performed action corresponding to the file system event when the outcome does not satisfy the outcome threshold.

DETAILED DESCRIPTION

Described embodiments provide improvements to computer technology to process reported file system events in a computer system by training one or more machine learning modules to determine actions to perform for input comprising file system event types. With described embodiments, actions from an action list are performed, and then if outcomes of the performed actions satisfy an outcome threshold, then the machine learning module is trained to output the action from input comprising the reported file system events resulting in the need for the action performed. There may be multiple machine learning modules trained to determine actions for different types of file system events, such as data errors, point-in-time copy operations, memory leaks, application callbacks, user file accesses, etc.

Figure 1:
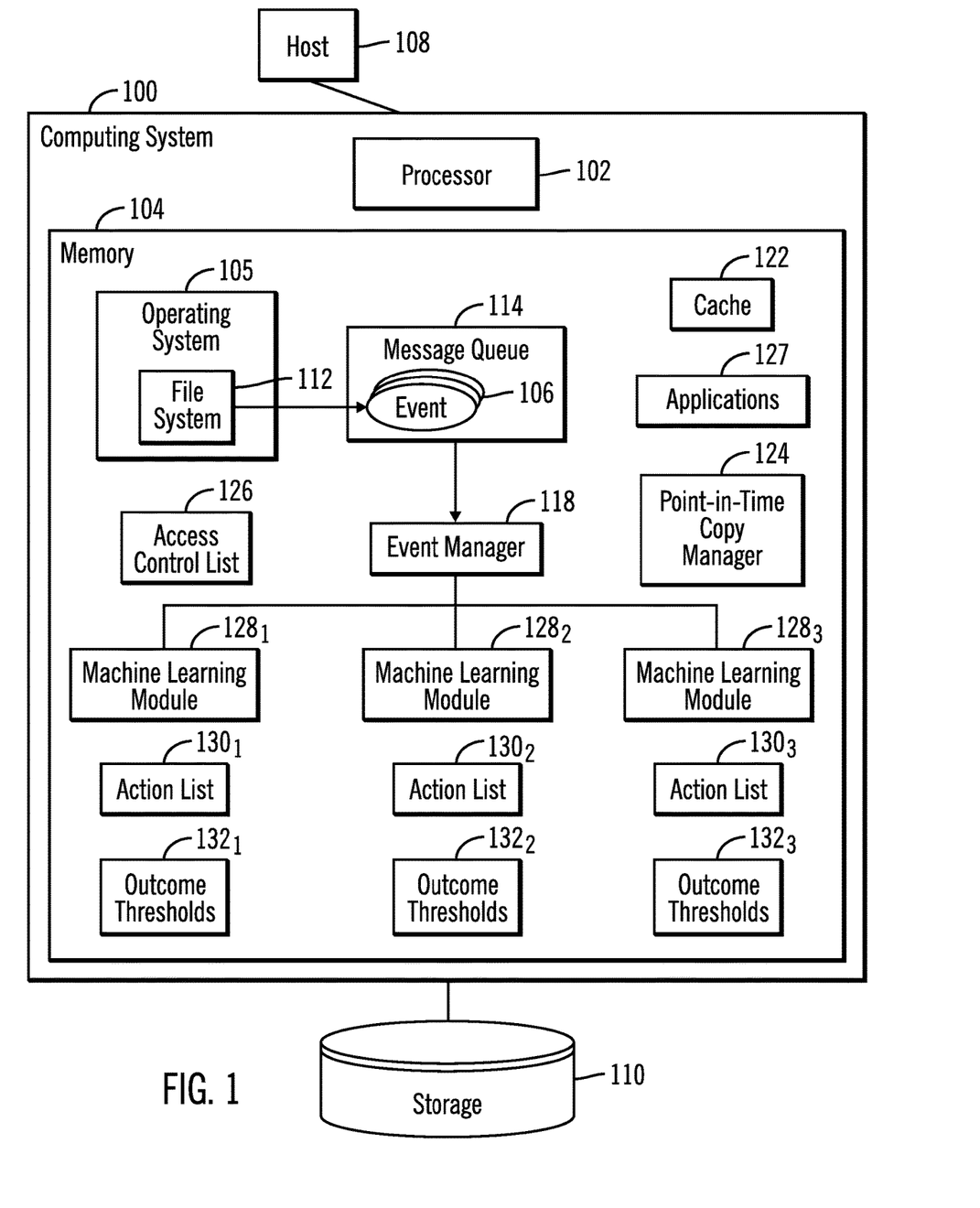
FIG. 1 illustrates an embodiment of a computing environment.

FIG. 1 illustrates an embodiment of a computing system 100 including a processor 102, such as one or more processor devices, and a memory 104 having program code executed by the processor 102. The memory 104 includes an operating system 105 to manage requests from attached hosts 108 to storage arrays configured in a storage system 110, and perform other related operations; a file system 112 to manage file system operations; a message queue 114 to receive event messages 116 from the file system; an event manager 118 to determine a machine learning module $120_1$, $120_2$, $120_3$ to which to direct event messages 106, such that the machine learning module $120_1$ is trained to produce output of course of action based on the event messages 106. The memory further includes a cache 122 to cache data between the storage 110 and hosts 108; a point-in-time copy manager 124 to perform and manage point-in-time copying of data in the storage 110; an access control list 126 indicating file access controls for files in the file system 112 for users, including restrictions based on time, files, directories, etc.; and applications 127 accessing the file system 112, which may be in the computing system 100 or in one of the hosts 108 (not shown).

The machine learning modules $128_1$, $128_2$, $128_3$ are trained using corresponding action lists $130_1$, $130_2$, $130_3$ comprising actions to address issues raised by the file system events 106. The machine learning module $128_1$, $128_2$, $128_3$ are trained to output an action from the action lists $130_1$, $130_2$, $130_3$ for inputs comprising detected events 106 based on whether performing the actions produces outcomes satisfying outcome thresholds $132_1$, $132_2$, $132_3$. The input to the machine learning modules $128_1$, $128_2$, $128_3$ may also comprise other operating system 105 and system 100 parameters and conditions. There may be different machine learning modules $128_1$, $128_2$, $128_3$ for different types of events to produce the outcomes for the different type of events. For instance, there may be a machine learning module $128_i$ to (i) determine file system error correction operations based on file system events indicating file and data errors; (ii) to determine point-in-time copy operations based on point-in-time copy operation events; (iii) to determine applications 127 to message concerning detected memory leak events to debug and correct the application code producing the memory leak based on a memory access pattern; (iv) to determine applications 127 to send messages for a type of correction based on application callbacks; and (v) to determine whether a user access triggers a security violation notification based on a file access pattern.

The memory 104 may comprise a suitable volatile or non-volatile memory devices.

In the embodiment of FIG. 1, the memory 104 includes one or more machine learning modules $128_1$, $128_2$, $128_3$ that receive input comprising file system events 106 and produces an output indicating an action to perform to correct errors and improve performance and operations based on the events 106. The machine learning modules $128_1$, $128_2$, $128_3$ implement a machine learning technique such as decision tree learning, association rule learning, artificial neural network, inductive programming logic, support vector machines, Bayesian models, etc., to determine the output action to be performed to address problems indicated in the events 106.

In one embodiment, the machine learning modules $128_1$, $128_2$, $128_3$ may comprise artificial neural network programs. In neural network implementations, weights and biases in a hidden layer of nodes would be assigned to these inputs to indicate their predictive quality in relation to other of the inputs based on training to reach desired output actions to perform for the file system 112 for which the machine learning module $120_i$ is producing outputs.

Each neural network may be trained using backward propagation to adjust weights and biases at nodes in a hidden layer to produce adjusted outputs of actions to perform from the action list $130_i$ based on the file system events 106 and which action produces outcomes satisfying outcome thresholds $132_i$. A margin of error may be determined with respect to the actual output action from the machine learning module $128_i$ and an expected output based on system performance and outcomes to train the machine learning module $128_i$ to produce the desired output value based on a calculated expected output. In backward propagation, the margin of error of the output is measured and the weights and biases at nodes in the hidden layer are adjusted accordingly to decrease the error. Backward propagation may comprise an algorithm for supervised learning of artificial neural networks using gradient descent. Given an artificial neural network and an error function, the method may calculate the gradient of the error function with respect to the neural network's weights and biases.

The machine learning modules $128_1$, $128_2$, $128_3$ are shown in FIG. 1 as program code loaded into the memory 104 and executed by the processor 102. Alternatively, some or all of the functions may be implemented in hardware devices in the computing system 100, such as in Application Specific Integrated Circuits (ASICs), Field Programmable Gate Arrays (FPGAs) or executed by separate dedicated processors.

The storage 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage 110, such as Just a Bunch of Disks (JBOD), Direct Access Storage Device (DASD), Redundant Array of Independent Disks (RAID) array, virtualization device, etc. Further, the storage devices in the array 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
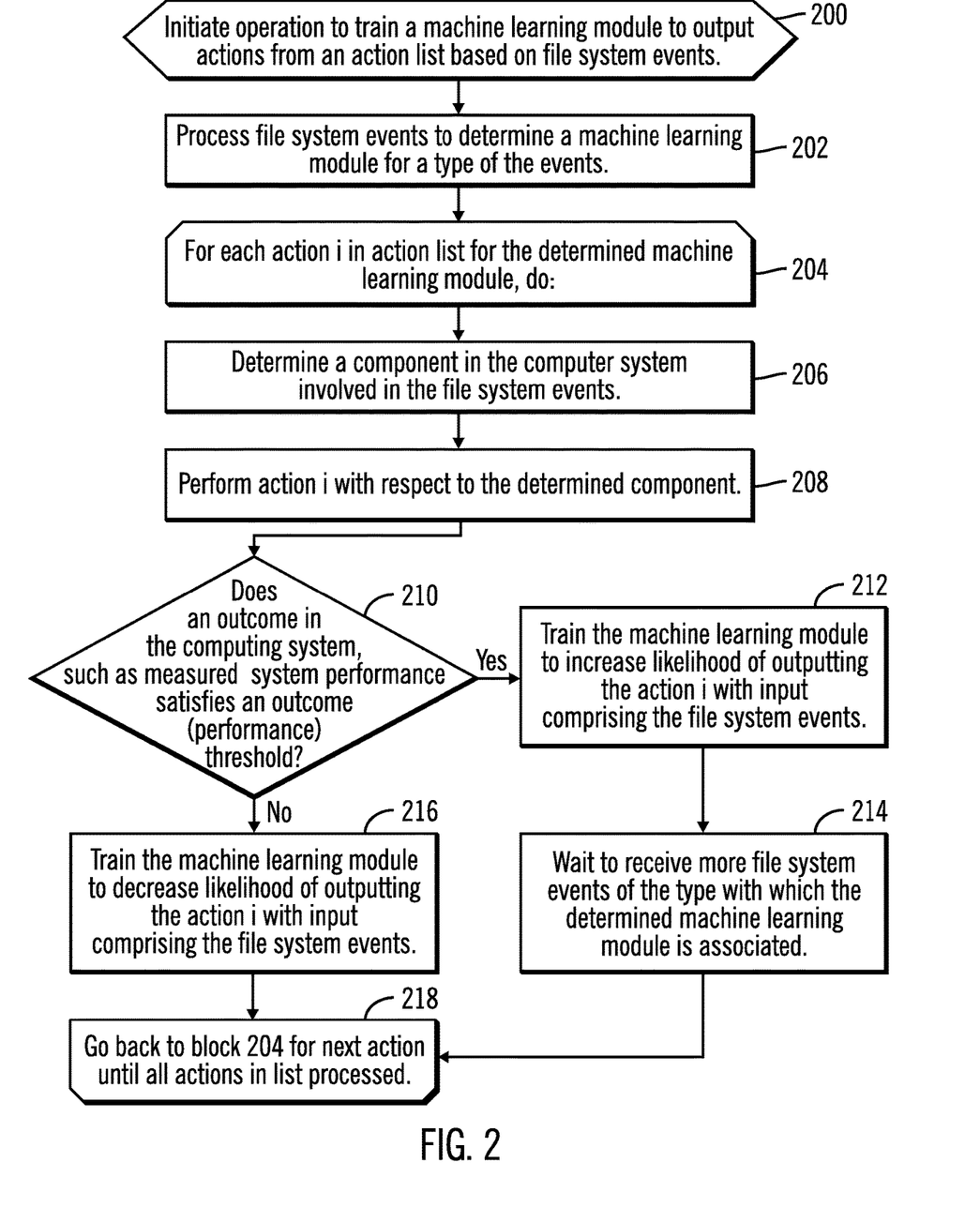
FIG. 2 illustrates an embodiment of operations to train a machine learning module to output actions to perform based on file system events.

FIG. 2 illustrates an embodiment of operations implemented in the event manager 118 and/or a machine learning module $128_i$ to train the machine learning module $128_i$ to produce output actions from an action list $130_i$ for a type of the events 106 added to the message queue 114 by the file system 112. The operations of FIG. 2 may be performed during file system 112 operations. Upon initiating (at block 200) an operation to train the machine learning module $128_i$ for reported file system 112 events 106, the event manager 118 processes (at block 202) file system events 106 to determine a machine learning module $128_i$ for a type of the events, e.g., file system data errors, point-in-time copy operations, memory leaks, application callbacks, file access patterns, etc. A loop of operations is performed at blocks 204 through 218 for each action i in the action list $130_i$ for the machine learning module $128_i$, where each action in the list $130_i$ is a file system 112 or other action, such as point-in-time copy manager 124 operations that may be performed. A determination is made (at block 206) of a component in the computer system 100 involved in the file system events 106, such as having the errors or problems for which the corrective action in the action list $130_i$ should be performed. The file system action i is performed (at block 208) with respect to the determined component.

If (at block 210) an outcome in the computing system 100 after performing the action i, such as a measured system performance, satisfies an outcome threshold $132_i$ for the machine learning module $128_i$, then the machine learning module $128_i$ is trained (at block 212) to increase the likelihood of outputting indication to perform the action i when the input to the machine learning module $128_i$ comprises the processed file system events 106. After training the machine learning module $128_i$ to output the action i based on the processed events 106, the machine learning module may wait (at block 214) to receive further file system events 106 to train a next action in the action list $130_i$. If (at block 210) the outcome does not satisfy the outcome threshold $132_i$, such as performance is not improved or errors corrected, then the machine learning module $128_i$ is trained (at block 216) to decrease the likelihood of outputting indication to perform the action i when the input to the machine learning module $128_i$ comprises the processed file system events 106. From block 216 or 214, control proceeds to block 218 to process the next action in the action list $130_i$ to determine whether the next action addresses issues raised by reported file system events.

With the embodiment of FIG. 2, the machine learning module $128_i$ is trained by determining which actions in an action list $130_i$ address errors or problems related to reported file system events 106 by determining whether the outcome of a performed action satisfies an outcome threshold $132_i$ related to performance or an error or problem being corrected. These training operations may be performed during file system 112 operations to further improve the predictability of the machine learning modules.

Figure 3:
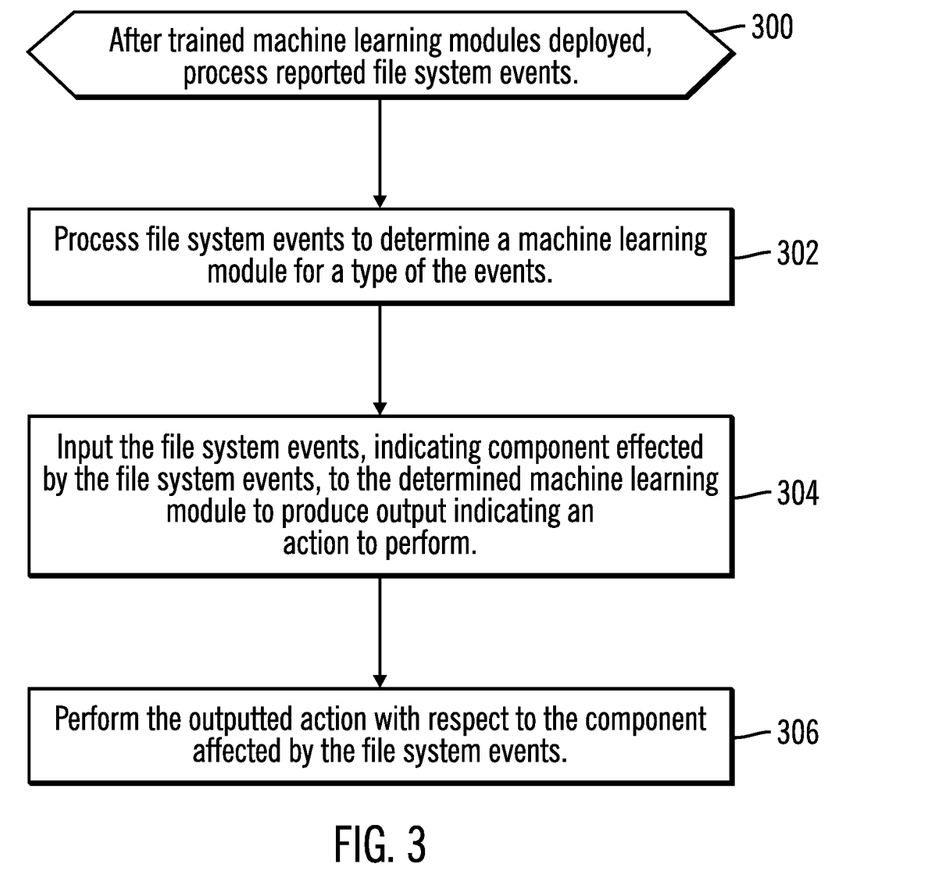
FIG. 3 illustrates an embodiment of operations to use a machine learning module after training to determine actions to perform for file system events.

FIG. 3 illustrates an embodiment of operations performed by the event manager 18 and machine learning modules $128_1$, $128_2$, $128_3$ after being trained as deployed in a computer system 100 to determine actions to perform for reported file system events 106. Upon processing (at block 300) reported file system events 106, the event manager 118 processes (at block 302) file system events 106 to determine a machine learning module $128_i$ for a type of the events 106. For instance, if the events comprise data errors, then the machine learning module $128_i$ is selected that handles data errors in the file system, if the event comprise point-in-time copy operations, then the machine learning module $128_i$ is selected that handles point-in-time copy related events 106, etc. The event manager 118 inputs (at block 304) the file system events 106, indicating a component effected by the file system events, to the determined machine learning module $128_i$ to produce output indicating an action to perform. The outputted action is then performed (at block 306) with respect to the component affected by the file system events to correct errors, generate notifications, configure components, etc.

FIGS. 4-8 illustrate specific implementations on the type of the file system events for which the machine learning modules $128_1$, $128_2$, $128_3$ are trained for action lists $130_1$, $130_2$, $130_3$. FIGS. 4-8 provide the training operations at blocks 206-216 in FIG. 2 that are performed for different types of events, e.g., file system errors, point-in-time copy operations, memory leaks, application callbacks, and user file accesses. The training operations may be performed while the file system is in use, i.e., in parallel with file system 112 operations, and/or prior to deploying the file system 112.

Figure 4:
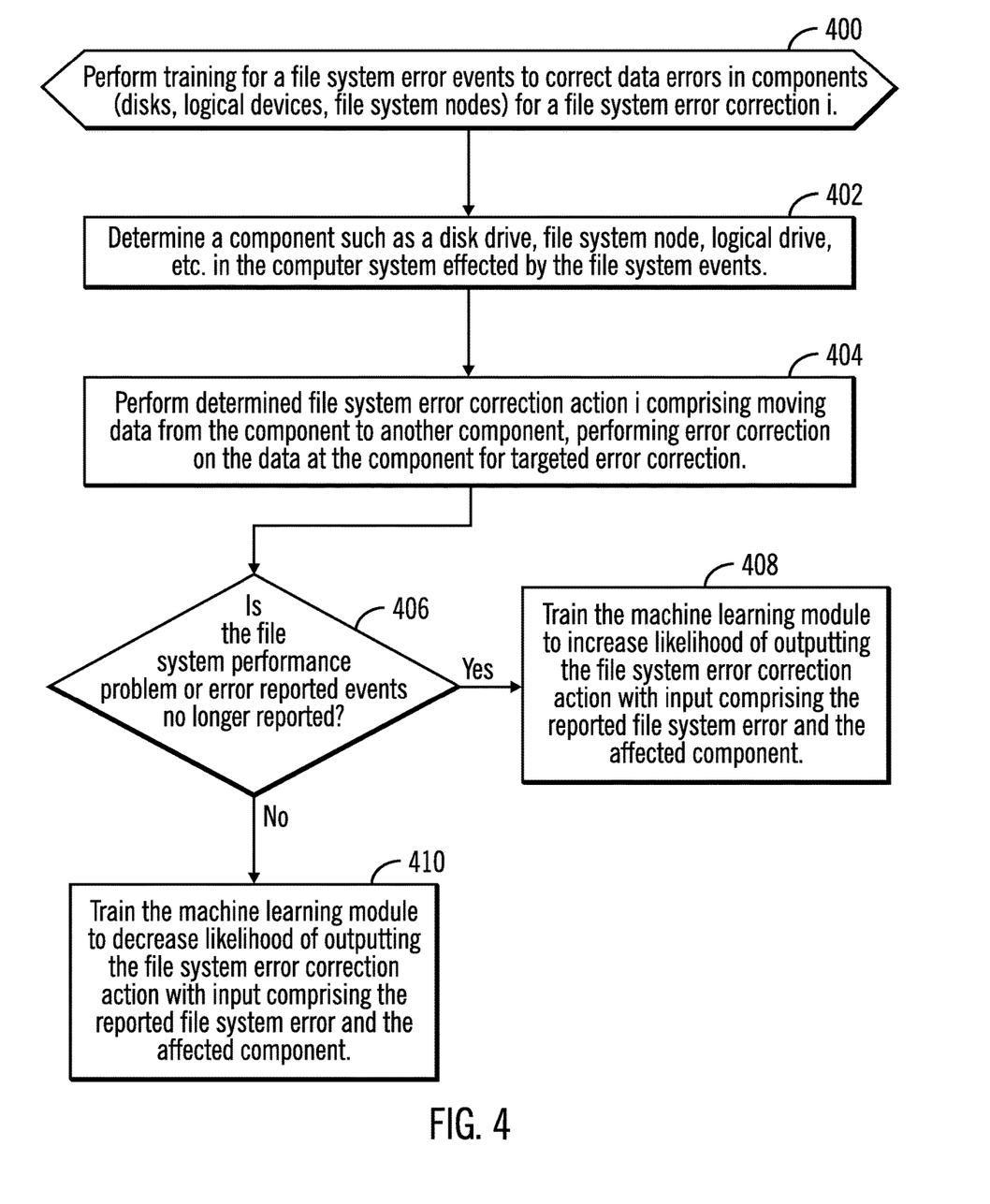
FIG. 4 illustrates an embodiment of operations to train a machine learning module to output actions for input comprising file system events for point-in-time copy operations.

FIG. 4 illustrates an implementation to train a machine learning module $128_i$ where the reported events 106 used as input comprise file system error or performance events related to data errors or performance issues in computer system 100 components, such as disks, logical devices, file system nodes or objects, e.g., directory, file, inodes, etc. The action list $130_i$ may comprise different error correction activities, such as move data to another disk, logical device, file system node, correct data, etc. Upon initiating (at block 400) training for file system error events 106, the machine learning module $128_i$ or other program determines (at block 402) a component such as a disk drive, file system node, logical drive, etc. affected by the file system events. The determined file system error correction action i in the list of actions $130_i$ is performed (at block 404), such as moving data from the component to another component, performing error correction on the data at the component for targeted error correction, etc. If (at block 406) the file system events are no longer reported or detected, then the machine learning module $128_i$ is trained (at block 408) to increase likelihood of outputting the file system error correction action i with input comprising the reported file system error and the affected component. If (at block 410) the file system events are no longer reported or detected, then the machine learning module $128_i$ is trained (at block 408) to decrease likelihood of outputting the file system error correction action i with input comprising the reported file system error and the affected component.

Figure 5:
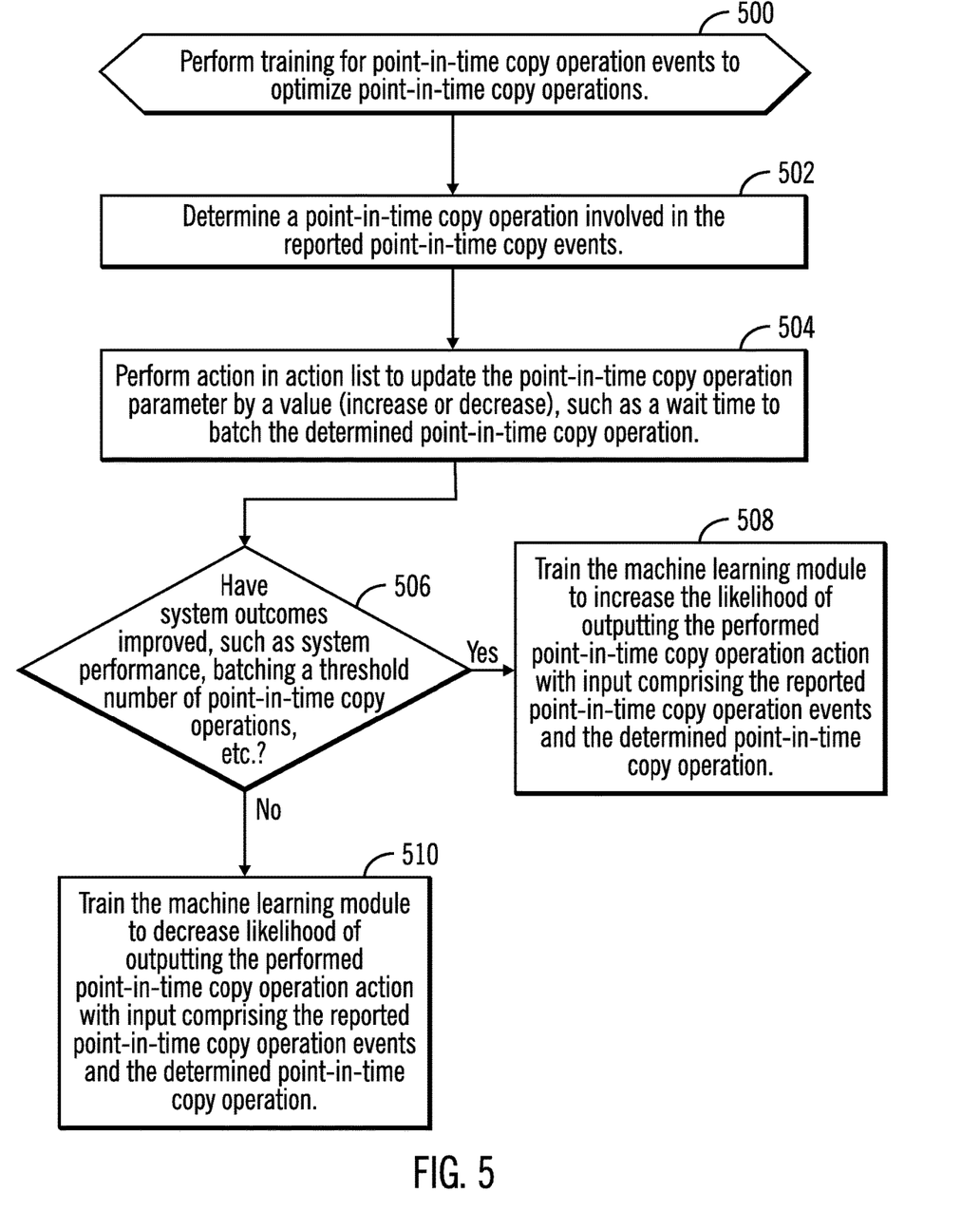
FIG. 5 illustrates an embodiment of operations to train a machine learning module to output actions for input comprising file system events for data errors in file system components.

FIG. 5 illustrates an embodiment of operations to perform training of a machine learning module $128_i$ for point-in-time copy operation related events to optimize point-ion-time copy operations. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

Upon performing training (at block 500) of a machine learning module $128_i$ for point-in-time copy operations, the machine learning module $128_i$ or other program determines (at block 502) a point-in-time copy operation involved in the reported point-in-time copy events 106. An action is performed in the action list $130_i$ to update a point-in-time copy operation parameter value (increase or decrease), such as change a wait time to batch the determined point-in-time copy operations, to perform a type of point-in-time copy operation such as delete point-in-time copies to free space, etc. If (at block 506) system or point-in-time outcomes have improved or satisfy the outcome thresholds $132_i$, such as system performance or point-in-time copy operation performance is improved, such as by batching a threshold number of point-in-time copy operations, then the machine learning module $128_i$ is trained (at block 508) to increase the likelihood of outputting the performed point-in-time copy operation action with input comprising the reported point-in-time copy operation events and the determined point-in-time copy operation. If (at block 506) the outcome thresholds $132_i$ are not satisfied, then the machine learning module $128_i$ is trained (at block 510) to decrease the likelihood of outputting the performed point-in-time copy operation action with input comprising the reported point-in-time copy operation events and the determined point-in-time copy operation.

Figure 6:
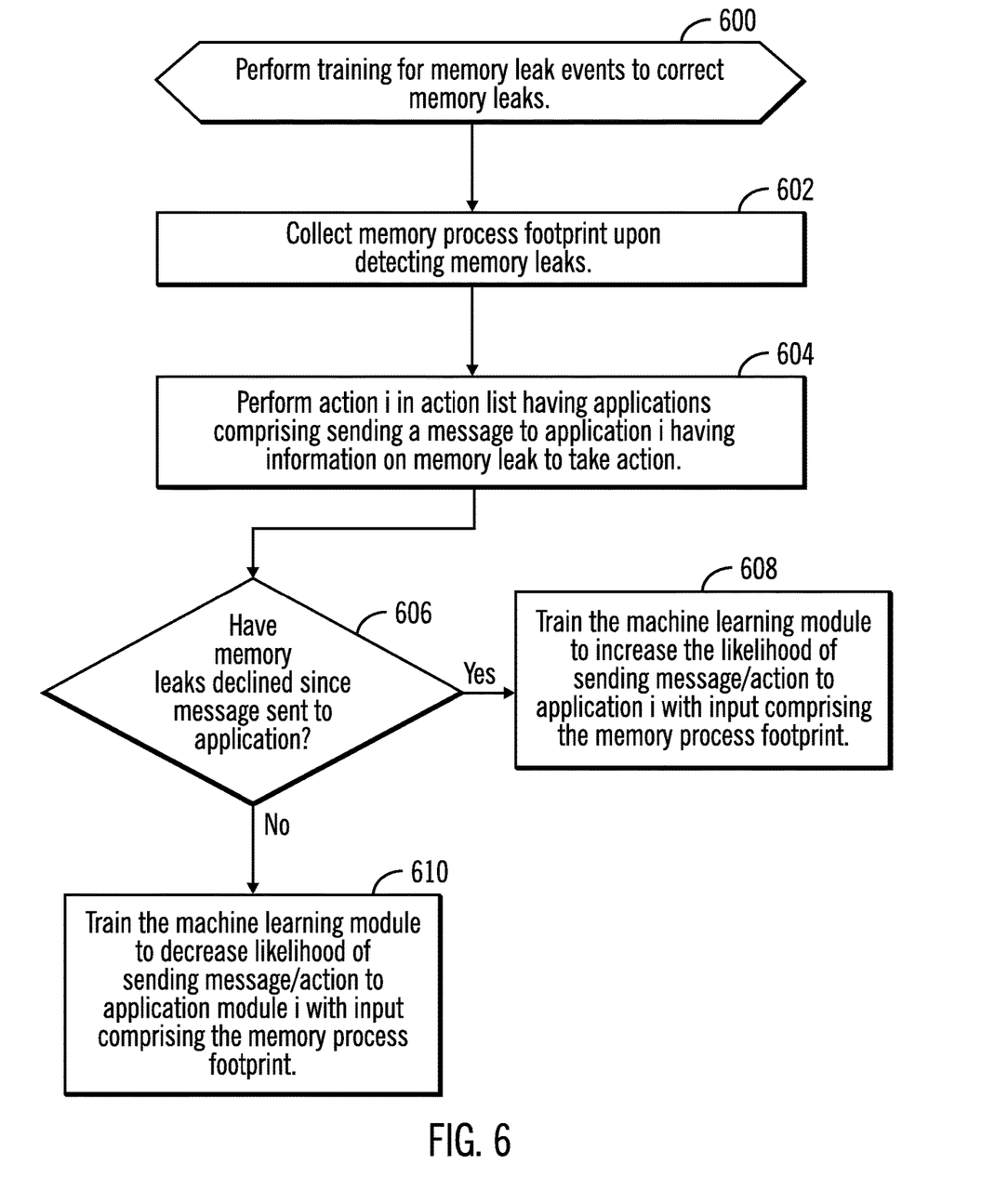
FIG. 6 illustrates an embodiment of operations to train a machine learning module to output actions for input comprising file system events for memory leaks.

FIG. 6 illustrates an embodiment of operations to train a machine learning module $128_i$ to identify the root cause of file system events 106 comprising memory leak events in the memory 104 during file system 112 operations. A memory leak comprises a failure of an application to properly manage memory allocations and release memory not being used, resulting in impaired memory 104 and system 100 performance. The action list $130_i$ for retraining the machine learning module $128_i$ comprises applications 127 to which to direct a message notifying of the memory leak, such that the machine learning module is trained to identify an application in the action list $130_i$ that is the root cause of the memory leaks. Upon initiating (at block 600) training a machine learning module $128_i$ to identify applications 127 that are the source of memory leaks, the machine learning module $128_i$ or other program collects a memory process footprint upon detecting memory leak events 106. The memory process footprint may comprise user space memory mappings, such as determined using a supervisor mode access prevention (SMAP) component. The action performed comprises sending (at block 604) a message to an application i indicated in the action list $130_i$ on the memory leak to cause the program developer to debug the application or change its operations to reduce memory leaks. If (at block 606) the memory leaks have declined since sending the message to the application, the machine learning module $128_i$ is trained (at block 608) to increase the likelihood of sending message/action to application i with input comprising the memory process footprint. If (at block 606) the memory leaks have not declined since sending the message to the application, the machine learning module $128_i$ is trained (at block 610) to decrease the likelihood of sending message/action to application i with input comprising the memory process footprint.

Figure 7:
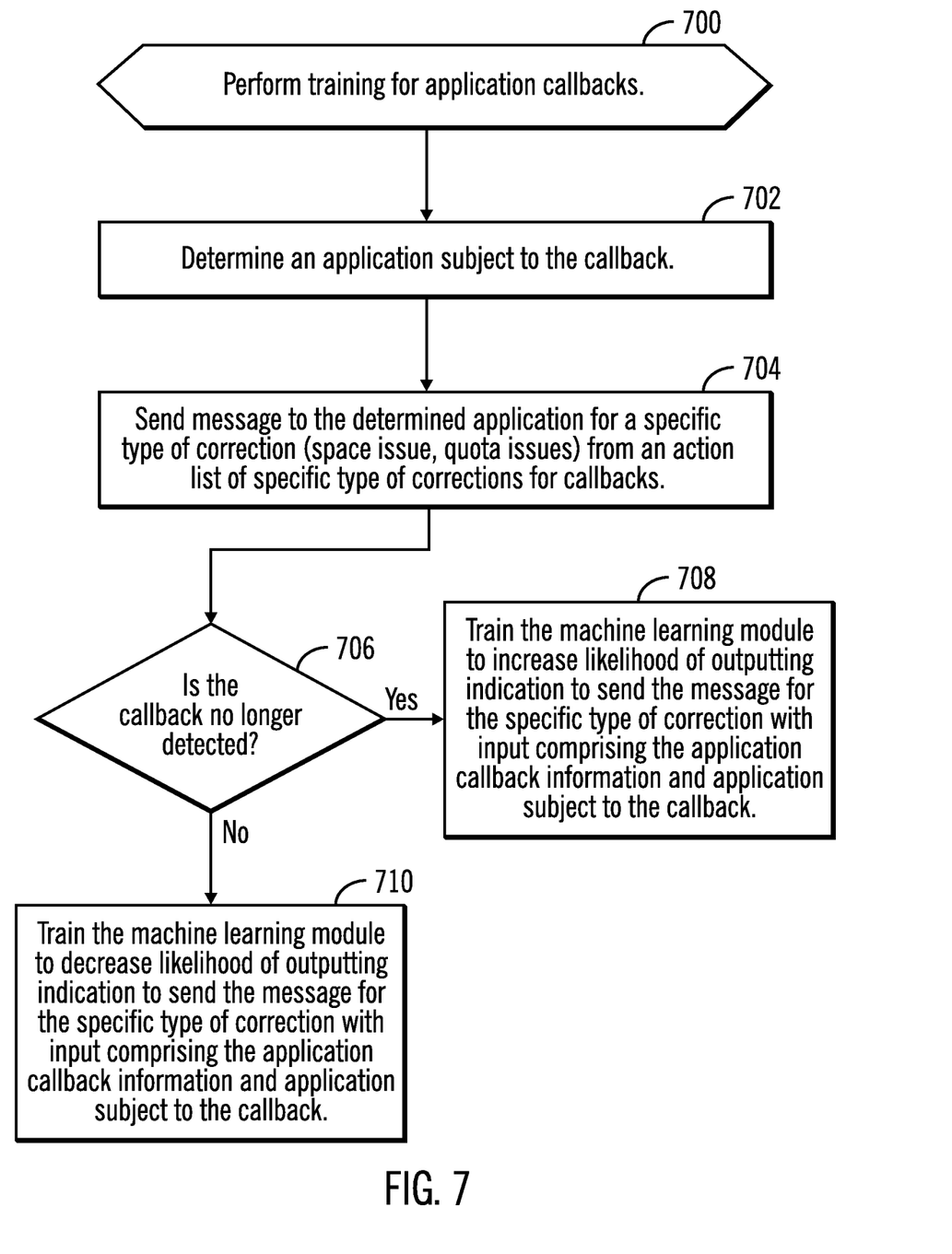
FIG. 7 illustrates an embodiment of operations to train a machine learning module to output actions for input comprising file system events for application callbacks.

FIG. 7 illustrates an embodiment of operations to train a machine learning module $128_i$ to process file system events 106, during file system 112 operations, comprising application callbacks to determine a message to return to an application 127, such as notifying of low space situations, resource quota issues, etc. The application 127 may then perform an action to address the issue raised by the callback that may affect computer system 100 performance. Upon training (at block 700) a machine learning module $128_i$ to process application callbacks, a determination is made (at block 702) of the application 127 subject to the callback. A message is sent (at block 704) to the determined application 127 for a specific type of correction (space issue, quota issues) from an action list of specific type of corrections for callbacks. In this way, the machine learning module $128_i$ is trained to indicate the correct message to send to the application 127 subject to the callback. If (at block 706) after sending the message, the callback is no longer detected, then the machine learning module $128_i$ is trained (at block 708) to increase likelihood of outputting indication to send the message for the specific type of correction with input comprising the application callback information and application 127 subject to the callback. If (at block 706) after sending the message, the callback is no longer detected, then the machine learning module $128_i$ is trained (at block 710) to decrease likelihood of outputting indication to send the message for the specific type of correction with input comprising the application callback information and application 127 subject to the callback.

Figure 8:
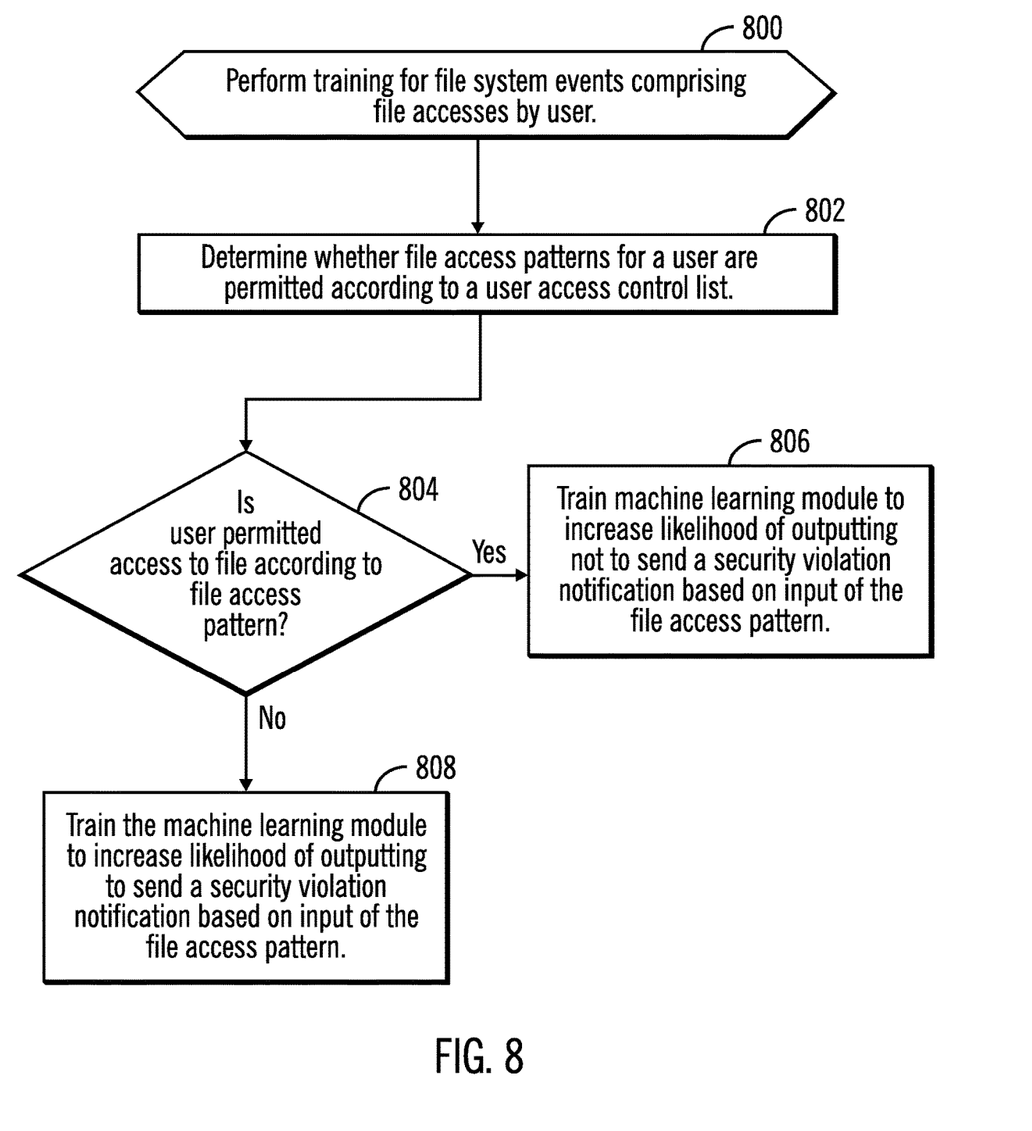
FIG. 8 illustrates an embodiment of operations to train a machine learning module to output actions for input comprising file system events for file accesses by users in the file system.

FIG. 8 illustrates an embodiment of operations to train a machine learning module $128_i$ to output, based on events 106 comprising file access patterns during file system 112 operations, indicating whether a user file access is permitted access based on the access control list 126. In this way, the machine learning module $128_i$ is trained to implement the access control list 126 to determine whether file access pattern events indicate permitted or unauthorized file accesses. Upon initiating the training of the machine learning module $128_i$ for file access patterns, the machine learning module $128_i$ or other program determines (at block 802) whether the file access patterns for a user are permitted according to a user access control list 126. If (at block 804) the user is permitted access to a file according to the file access pattern, then the machine learning module $128_i$ is trained (at block 806) to increase the likelihood of outputting not to send a security violation notification based on input of the file access pattern. If (at block 804) the user is not permitted access to file according to the file access pattern, then the machine learning module $128_i$ is trained (at block 806) to increase the likelihood of outputting to send a security violation notification to the application 127 accessing the files based on input of the file access pattern. A user upon receiving the notification may take corrective action, such as avoid accessing unauthorized files or request authorization from an administrator.

In the described embodiment, variables i and n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
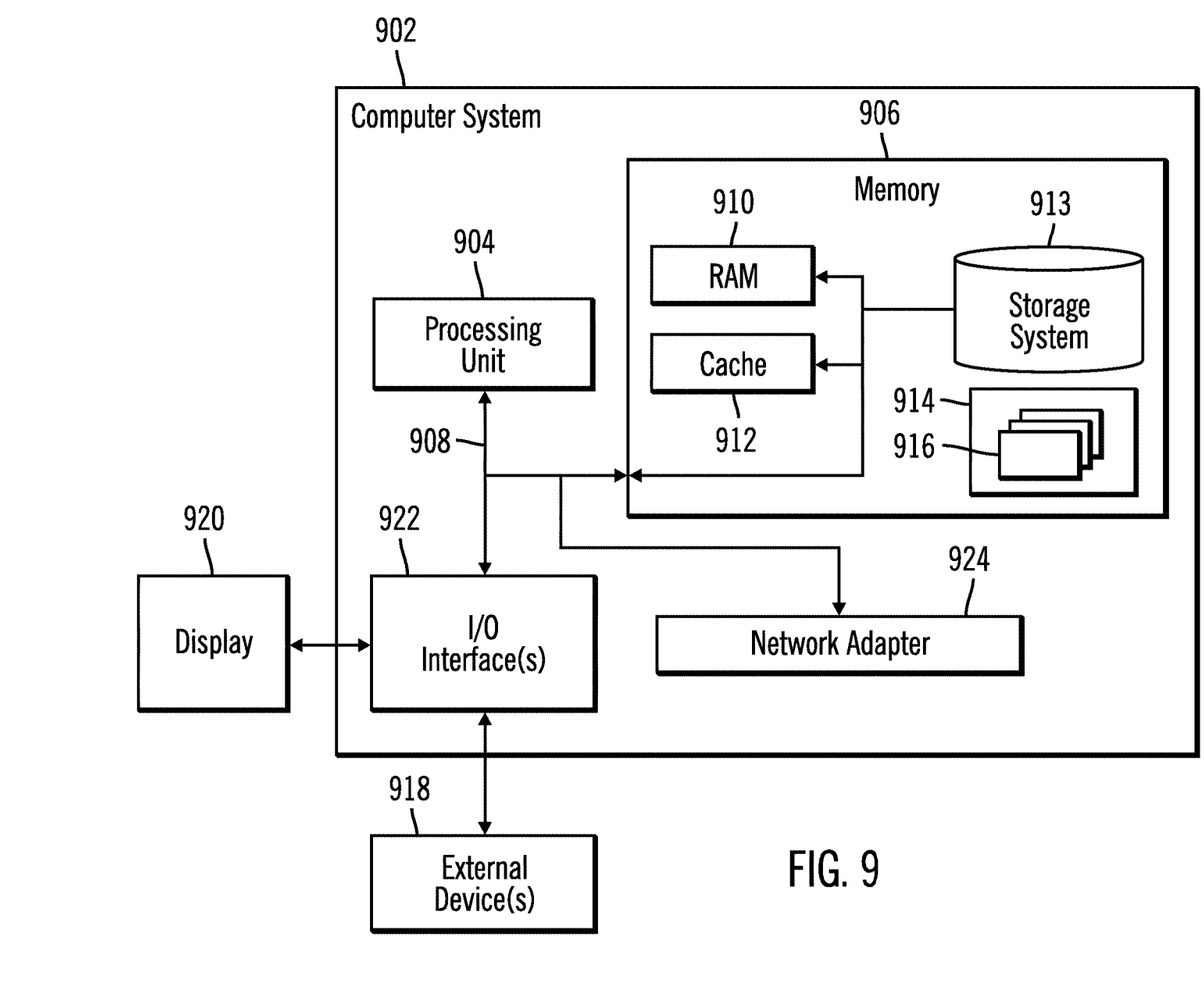
FIG. 9 illustrates a computing environment in which the components of FIG. 1 may be implemented.

The computational components of FIG. 1, including the computer system 100 and host 108 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining actions to be taken in response to file system events in a file system, comprising a computer readable storage medium having computer readable program code embodied therein that when executed in a computer system performs operations, the operations comprising:
   detecting a file system event;
   selecting, from an action list, an action to perform corresponding to the file system event;
   determining whether an outcome in the computing system resulting from performing the selected action satisfies an outcome threshold, wherein the outcome comprises a performance measurement in the computing system resulting from performing the selected action;
   training a machine learning module to increase a likelihood of selecting the selected action corresponding to the file system event when the outcome satisfies the outcome threshold; and
   training the machine learning module to decrease a likelihood of selecting the selected action corresponding to the file system event when the outcome does not satisfy the outcome threshold.

2. The computer program product of claim 1, wherein the operations further comprise:
   processing the file system events to determine a component in the computer system involved in the file system events before performing each action, wherein each action is performed with respect to the determined component in the computer system.

3. The computer program product of claim 1, wherein the operations further comprise:
   performing all the actions in the action list to train the machine learning module to increase or reduce the likelihood of outputting the actions in response to outcomes of the actions satisfying an outcome threshold; and
   deploying the machine learning module to determine actions to output based on file system events after training the machine learning module on all the actions in the action list.

4. The computer program product of claim 1, wherein the performance measurement comprises measured computer system performance parameters, and wherein the determining whether the outcome satisfies the outcome threshold comprises determining whether the measured computer system performance parameters satisfy performance thresholds for the measured computer system performance parameters.

5. The computer program product of claim 1, wherein there are a plurality of machine learning modules for different types of file system events trained to output actions in different action lists for the different types of file system events.

6. The computer program product of claim 1, wherein the file system events indicate errors in a file system, and wherein the actions in the action list comprise file system error correction operations, wherein the operations further comprise:
   processing the file system events to determine a file system component subject to the errors in the file system, wherein the performing an action from the action list comprises targeting the file system error correction operations toward the file system component subject to the errors in the file system.

7. The computer program product of claim 1, wherein the file system events comprise point-in-time copy operations to create point-in-time copies of data in the file system, and wherein the actions in the action list comprise actions to modify the point-in-time copy operations to improve performance of the point-in-time copy operations.

8. The computer program product of claim 7, wherein the actions in the action list comprise actions to increase and decrease a time to wait to batch point-in-time copy operations, wherein the outcome indicates a number of point-in-time copy operations performed during the time to wait to batch point-in-time copy operations, and wherein the machine learning module is trained to perform the selected action of increasing the time to wait to batch point-in-time copy operations in response to the outcome being less than a threshold number of point-in-time copy operations and to perform the selected action of decreasing the time to wait to batch point-in-time copy operations in response to the outcome being greater than the threshold number.

9. The computer program product of claim 1, wherein the file system events indicate memory leaks in a memory, wherein the outcome comprises detected memory leaks, wherein the actions indicate applications identified as a source of the memory leak, and wherein the machine learning module is trained with input comprising a memory process footprint to output indication to send a message to the application on the memory leaks in response to the detected memory leaks following the sending of the message to the application falling below a memory leak threshold and trained to not send a message to the application on the memory leaks in response to the detected memory leaks following the sending of the message to the application falling below a memory leak threshold.

10. The computer program product of claim 1, wherein the file system events indicate application callbacks, wherein the actions comprise messages indicating different corrections, wherein the outcome comprises continued or no continued application callbacks after sending a message, and wherein the machine learning module is trained with input comprising parameters of an application callback to send a message to an application subject to the application callback in response to the outcome comprising no more of the application callback for which the message was sent and trained to not send a message to the application subject to the application callback in response to the outcome comprising more of the application callback for which the message was sent.

11. The computer program product of claim 1, wherein the file system events comprise file accesses by users of the computer system, wherein the outcome comprises file access patterns from users in the computer system, wherein determining whether the outcome satisfies the outcome threshold comprises determining whether the file access patterns from users are permitted by the computer system, wherein the performing the actions comprises generating an alert of unauthorized access in response to determining that the file access patterns from the users are not permitted, wherein the machine learning module is trained to produce the alert of unauthorized access for file system patterns by users not authorized by the computer system.

12. A system for determining actions to be taken in response to file system events in a file system, comprising:
   a processor;
   a machine learning module; and
   a computer readable storage medium having computer readable program code embodied therein that when executed by the processor performs operations, the operations comprising:
      detecting a file system event;
      selecting, from an action list, an action to perform corresponding to the file system event;
      determining whether an outcome in the system resulting from performing the selected action satisfies an outcome threshold, wherein the outcome comprises a performance measurement in the system resulting from performing the selected action;
      training the machine learning module to increase a likelihood of selecting the selected action corresponding to the file system event when the outcome satisfies the outcome threshold; and
      training the machine learning module to decrease a likelihood of selecting the selected action corresponding to the file system event when the outcome does not satisfy the outcome threshold.

13. The system of claim 12, wherein the file system events indicate errors in a file system, and wherein the actions in the action list comprise file system error correction operations, wherein the operations further comprise:
   processing the file system events to determine a file system component subject to the errors in the file system, wherein the performing an action from the action list comprises targeting the file system error correction operations toward the file system component subject to the errors in the file system.

14. The system of claim 12, wherein the file system events comprise point-in-time copy operations to create point-in-time copies of data in the file system, and wherein the actions in the action list comprise actions to modify the point-in-time copy operations to improve performance of the point-in-time copy operations.

15. The system of claim 12, wherein the file system events indicate memory leaks in a memory, wherein the outcome comprises detected memory leaks, wherein the actions indicate applications identified as a source of the memory leak, and wherein the machine learning module is trained with input comprising a memory process footprint to output indication to send a message to the application on the memory leaks in response to the detected memory leaks following the sending of the message to the application falling below a memory leak threshold and trained to not send a message to the application on the memory leaks in response to the detected memory leaks following the sending of the message to the application falling below a memory leak threshold.

16. The system of claim 12, wherein the file system events indicate application callbacks, wherein the actions comprise messages indicating different corrections, wherein the outcome comprises continued or no continued application callbacks after sending a message, and wherein the machine learning module is trained with input comprising parameters of an application callback to send a message to an application subject to the application callback in response to the outcome comprising no more of the application callback for which the message was sent and trained to not send a message to the application subject to the application callback in response to the outcome comprising more of the application callback for which the message was sent.

17. The system of claim 12, wherein the file system events comprise file accesses by users of the system, wherein the outcome comprises file access patterns from users in the system, wherein determining whether the outcome satisfies the outcome threshold comprises determining whether the file access patterns from users are permitted by the system, wherein the performing the actions comprises generating an alert of unauthorized access in response to determining that the file access patterns from the users are not permitted, wherein the machine learning module is trained to produce the alert of unauthorized access for file system patterns by users not authorized by the system.

18. A method for determining actions to be taken in response to file system events in a file system in a computer system, comprising:
- detecting a file system event;
- selecting, from an action list, an action to perform corresponding to the file system event;
- determining whether an outcome in the computing system resulting from performing the selected action satisfies an outcome threshold, wherein the outcome comprises a performance measurement in the computing system resulting from performing the selected action;
- training a machine learning module to increase a likelihood of selecting the selected action corresponding to the file system event when the outcome satisfies the outcome threshold; and
- training the machine learning module to decrease a likelihood of selecting the selected action corresponding to the file system event when the outcome does not satisfy the outcome threshold.

19. The method of claim 18, wherein the file system events indicate errors in a file system, and wherein the actions in the action list comprise file system error correction operations, further comprising:
- processing the file system events to determine a file system component subject to the errors in the file system, wherein the performing an action from the action list comprises targeting the file system error correction operations toward the file system component subject to the errors in the file system.

20. The method of claim 18, wherein the file system events comprise point-in-time copy operations to create point-in-time copies of data in the file system, and wherein the actions in the action list comprise actions to modify the point-in-time copy operations to improve performance of the point-in-time copy operations.

21. The method of claim 18, wherein the file system events indicate memory leaks in a memory, wherein the outcome comprises detected memory leaks, wherein the actions indicate applications identified as a source of the memory leak, and wherein the machine learning module is trained with input comprising a memory process footprint to output indication to send a message to the application on the memory leaks in response to the detected memory leaks following the sending of the message to the application falling below a memory leak threshold and trained to not send a message to the application on the memory leaks in response to the detected memory leaks following the sending of the message to the application falling below a memory leak threshold.

22. The method of claim 18, wherein the file system events indicate application callbacks, wherein the actions comprise messages indicating different corrections, wherein the outcome comprises continued or no continued application callbacks after sending a message, and wherein the machine learning module is trained with input comprising parameters of an application callback to send a message to an application subject to the application callback in response to the outcome comprising no more of the application callback for which the message was sent and trained to not send a message to the application subject to the application callback in response to the outcome comprising more of the application callback for which the message was sent.

23. The method of claim 18, wherein the file system events comprise file accesses by users of the computer system, wherein the outcome comprises file access patterns from users in the computer system, wherein determining whether the outcome satisfies the outcome threshold comprises determining whether the file access patterns from users are permitted by the computer system, wherein the performing the actions comprises generating an alert of unauthorized access in response to determining that the file access patterns from the users are not permitted, wherein the machine learning module is trained to produce the alert of unauthorized access for file system patterns by users not authorized by the computer system.

* * * * *